Sept. 14, 1937.  J. F. MAINE  2,093,388
LOADING APPARATUS
Filed Nov. 30, 1935
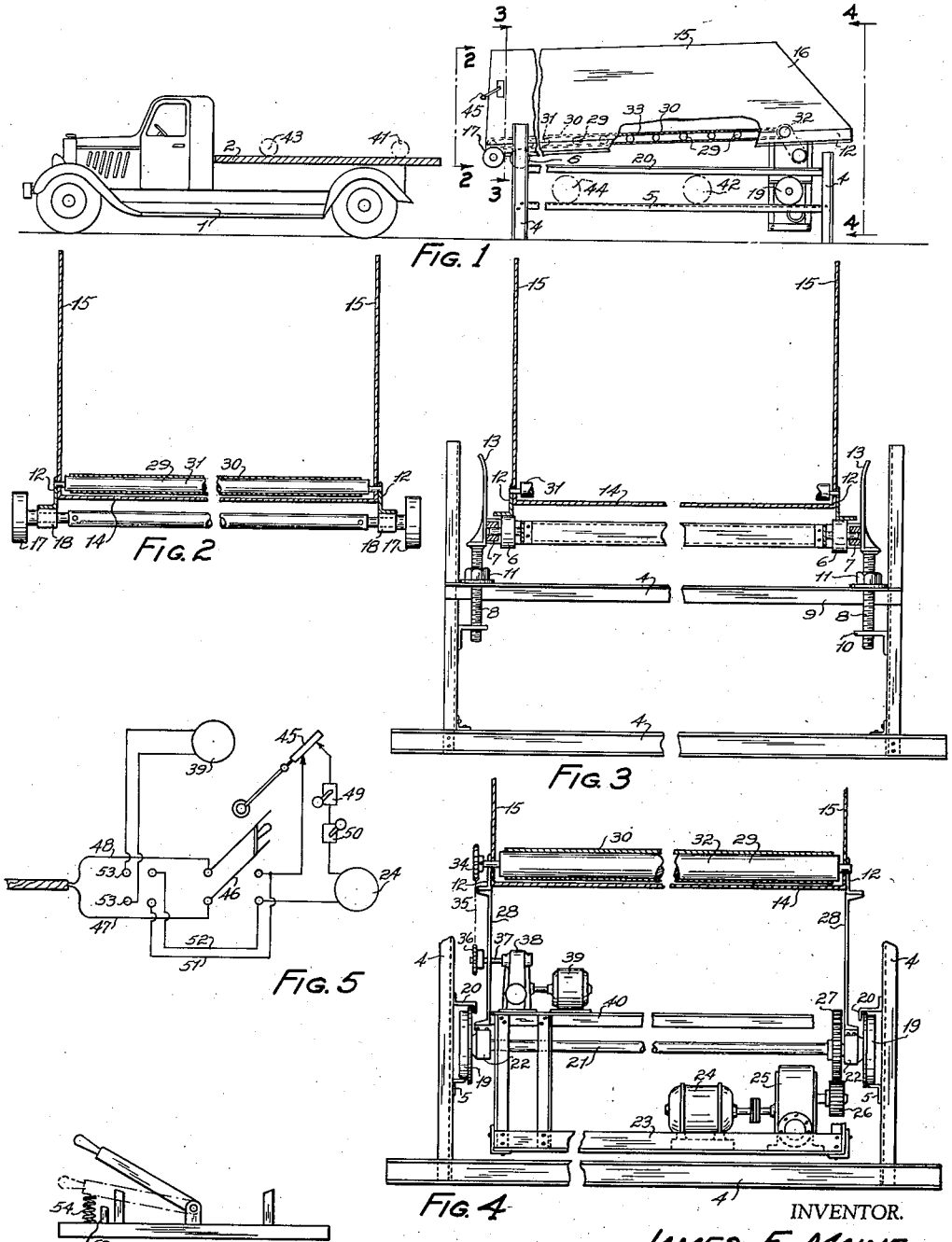
INVENTOR.
JAMES F. MAINE
BY
ATTORNEY.

Patented Sept. 14, 1937

2,093,388

UNITED STATES PATENT OFFICE 2,093,388

LOADING APPARATUS

James F. Maine, Cleveland, Ohio, assignor to The Consolidated Iron-Steel Mfg. Company, Cleveland, Ohio, a corporation of Ohio Application November 30, 1935, Serial No. 52,356

20 Claims. (Cl. 214—41)

This invention relates to loading apparatus for loading material into trucks, vans, etc., and particularly for loading unit pieces such as packages, boxes and the like.

In the use of delivery vehicles such as trucks, vans, etc., to transport and deliver goods of various kinds, it is in many cases desirable to place a great number of packages, boxes, etc. in the body of the vehicle in the reverse order in which they are to be removed and delivered at the successive stations or points of delivery along a predetermined delivery route.

Thus, the packages to be removed last are placed in the van first, etc.

It is also desirable that the vehicle when it is moved to the loading platform, may be loaded and started out on its route in the minimum of time. Heretofore it has, of course, been possible to have the load of packages or boxes prearranged at the loading platform in the order or arrangement in which they are to be placed in the vehicle, but it has been necessary to again handle them one at a time and load them into the van in this same prearranged order, and this is a time-consuming operation. This not only creates excessive cost for the necessary additional labor to rehandle the load, and for the time that the vehicle which may be an expensive automotive vehicle is necessarily idle; but it delays the delivery of the goods.

These operating expenses and delays have heretofore, so far as I am aware, been unavoidable in the delivery department of various businesses such as department stores, newspaper publishing houses, etc.

It is therefore the principal object of this invention to provide an apparatus or machinery by which this kind of loading of articles into a vehicle can be accomplished without rehandling of the material at the loading station and in the minimum of time.

Other objects are:

To provide generally an improved apparatus for loading articles into a vehicle;

To provide an improved apparatus whereby articles or packages which have been arranged in predetermined order in a pile at a loading platform may be loaded into a vehicle as a single unit without rehandling of the separate articles or packages;

To provide a loading apparatus for vehicles having an improved mode of operation;

To provide a loading apparatus for vehicles adapted to operate equally efficiently with vehicles having load-carrying beds of different height from the ground.

Other objects will be apparent to those skilled in the art to which my invention appertains.

My invention is fully disclosed in the following description taken in connection with the accompanying drawing, in which:

Fig. 1 is a side elevational view, partly diagrammatic, of an embodiment of my invention and illustrating operative relations thereof in association with a vehicle;

Fig. 2 is a front elevational view of a part of the apparatus of Fig. 1 drawn to a larger scale, the view being taken from the plane 2 of Fig. 1;

Fig. 3 is a sectional view to an enlarged scale taken approximately from the plane 3 of Fig. 1;

Fig. 4 is a rear elevational view of the apparatus of Fig. 1 drawn to a larger scale and taken from the plane 4 of Fig. 1;

Fig. 5 is a diagram of electrical connection which I may employ in connection with the apparatus of the other figures;

Fig. 6 is a view illustrating a switch apparatus which is illustrated diagrammatically in Fig. 5.

Referring to the drawing, I have illustrated generally at 1 a vehicle such as an automotive vehicle having a bed 2 upon which a plurality of articles such as packages, boxes, etc. are to be loaded in a predetermined order as hereinbefore referred to. The vehicle and the bed 2, of course, comprise no essential part of the present invention and may be any vehicle having a bed 2 upon which it is desired to load the articles, and the bed may have side walls and a roof thereover if desired, these parts being omitted in the drawing for simplicity. The apparatus for loading the articles will now be described.

At 4—4 is shown various elements of a frame which may have any suitable construction and which may be made from standard commercial sections of metal such as angle sections, channel sections, etc., but preferably the frame comprises a pair of rails 5—5 on opposite sides thereof extending longitudinally thereof upon which a carriage to be described may travel longitudinally.

At the forward end (toward the left as viewed in Fig. 1) of the frame 4—4 I provide a pair of rollers 6—6 rotatably supported on the frame in any suitable manner. In the preferred construction, the rollers are mounted in bearings 7—7 which may be elevated or lowered to adjust the elevation of the rollers. One such elevating mechanism is illustrated comprising screws 8—8 extending through aligned perforations in a flange of a transverse angle bar 9 and in a bracket 10 secured on the frame and having a nut 11 on the threads of the screw resting upon the angle bar 9. By turning the nut as will be understood, the rollers 6—6 may be raised or lowered to change their elevation for a purpose to be described.

A carriage is provided comprising longitudinally extending sills 12—12 which rests adjacent the forward ends upon the rollers 6—6 being retained thereon against lateral displacement by stanchions 13—13 secured to the screws 8 and/or bearings 7—7. The sills 12—12 may be connected transversely in any suitable manner, for example by a plate or plates 14; and side boards or side walls 15—15 may be provided, and thus the carriage may have generally the form of a skid or forwardly and rearwardly open channel.

At the forward end of the skid, which may now be referred to generally by the reference character 16, is secured a pair of oppositely disposed supporting wheels 17—17 having stub axles rotatable in bearing elements 18—18 which may be secured to the sills 12.

In the normal or disuse position of the skid illustrated in Fig. 1, the sills rest upon the rollers 6 and the wheels 17 are suspended upon the forward ends of the sills and carry none of the weight of the skid. The rearward end of the skid 16 is supported by flange wheel 19—19 resting upon the rails 5—5 at opposite sides of the frame 4. Guard rails 20—20 may be provided extending parallel to and disposed above the rails 5 to insure that the wheels 19 will remain on the rails 5 during longitudinal rolling thereon.

The wheels 19—19 are connected rigidly to a transverse axle 21. Bearings 22—22 are mounted on the axle 21 adjacent the wheels 19—19 and suspended therefrom is a stirrup-form frame 23 upon which is mounted an electric motor 24 transmitting power through a speed reduction gearing device 25 to a pinion 26 meshed with a gear 27 secured to the axle 21. By this means, when the motor 24 is energized, the axle 21 will be turned and will turn the wheels 19—19, which rolling on the rails 5—5 will propel the bearings 22 longitudinally of the main frame 4 and likewise will propel the skid which is secured to the bearings 22 in the manner now to be described.

Upon the upper sides of the bearings 22 at the rearward end of the frame are mounted supports 28—28 upon which the rearward ends of the sills 12 are supported, and to which they are secured. By means of supports 28 of suitable height, the sills 12—12 at their rearward ends will be higher than at their forward ends where they rest upon the rollers 6—6 and thus will incline forwardly downwardly as shown in Fig. 1.

The bed of the skid 16 upon which packages to be loaded upon the vehicle bed 2 are to be placed, consists of a belt and transverse rollers constituting a conveyor. The rollers 29—29 are disposed substantially in a plane parallel to the sills 12—12 and have rotational bearing at opposite ends thereof in suitable bearings in the sills 12—12, as shown in Fig. 2. The belt 30, made of any suitable material such as conveyor belt material, is preferably a closed belt, the opposite ends of which are looped over the extreme forward roller 31 and the extreme rearward roller 32; and as will be apparent, articles placed in the skid 16 will rest upon the upper flight 33 of the belt, being supported by the rollers 29.

The extreme rearward roller 32 is adapted to be rotatably driven to drive the belt by means of a sprocket wheel 34 mounted on a shaft extending axially from the roller 32 and outside of the side wall 15 on one side of the skid. The sprocket 34 is connected by a chain 35 to a lower sprocket 36 mounted on a shaft 37 receiving rotating power through a speed-reduction device 38 from an electric motor 39, the device and the motor being supported on a bracket 40 secured to the adjacent upright 28.

Apart from the electric circuits to be described later, the operation of the apparatus thus far described is as follows:

While the vehicle 1 is out on the delivery route or doing work elsewhere, the packages to be loaded are piled in the skid 16 upon the upper flight 33 of the belt with the skid in its rearward position illustrated in Fig. 1, the packages being arranged in the predetermined order hereinbefore referred to.

When the vehicle is backed up at the loading platform to be loaded, and into the position illustrated in Fig. 1, an operator starts up the motor 24 in the forward direction, leaving the motor 39 unenergized. The skid 16 is thereby propelled forwardly. The sills 12 incline downwardly forwardly and thus as the forward end of the skid moves forwardly, the wheels 17 will move downwardly. As the skid moves forwardly, the wheels 17 first overlap the bed 2 and gradually descend until they rest upon it in the position indicated in dotted lines at 41, the wheels 19 now being in the position 42. As the skid continues to move forwardly, the support of the forward end thereof is transferred to the wheels 17 and the sills 12—12 are lifted off of the rollers 6—6, the skid now being supported upon the forward wheels 17 and the flanged wheels 19. The skid continues to move forward until its extreme forward position is reached, whereat the wheels 17 are in the position 43 and the wheels 19 are in the position 44.

At this point, the arm 45 of a limit switch engages a part of the vehicle, for example the rear part of the driver's cab thereof, and by means to be described the motor 24 is thereby de-energized and the skid stops moving. The operator then starts the motor 24 in the reverse direction and starts the motor 39 simultaneously. The skid starts moving rearwardly and ultimately takes up its original position, but as the skid moves rearwardly, the upper flight 33 of the belt moves forwardly, the direction of the motor 39 being predetermined for this purpose.

Furthermore, by means of the reduction gearing devices 38 and 25, the speed ratio of the pinion 26 and the gear 27, the speed ratio of the sprocket wheels 36 and 34, and the size of the rearward belt roller 32, the forward speed of the belt flight 33 is made the same or substantially the same as the rearward movement of the skid. By this action, the packages on the belt flight are deposited on the bed 2 substantially without any sliding of the packages upon the belt flight and without any liability of injury thereto.

I have found that by this means, a load sufficient to fill a large truck or van body may be completely loaded into the vehicle without any disturbance whatever of the arrangement of the packages in their predetermined order, and the skid returned to its initial normal position in one minute of time.

While in some cases it may be suitable for the entire load in the skid to be discharged into a single vehicle, my invention may be practiced, so to speak, in multiple. That is to say, the length of the skid 16 may be great enough to hold at one time enough packages or articles to fill a number of vehicles. In Fig. 1 of the drawing the skid 16 is shown as longer than the bed 2 of the vehicle 1, and its length may be made several times as long as the vehicle bed, and it is believed not necessary to illustrate this modification herein other than to show by a break in the drawing, Fig. 1, that the skid and the frame may be longer than that illustrated.

When the apparatus above described is to be used in multiple, its operation is as follows. In the forward part of the skid 16, are placed the packages in prearranged order for the first vehicle. Behind that first pile of articles, and if desirable, suitably spaced a short distance therefrom, is made the pile in predetermined order for the second vehicle; and behind that and so on throughout the length of the skid 16, successive prearranged piles may be made.

To load the first vehicle, the skid is moved forward, without travel movement of the belt, as above described to its extreme forward position. Then the skid is withdrawn as above described while moving the belt flight 33 forwardly. In this instance, when, by retraction of the skid 16 and forward travel of the belt flight 33, the first pile of packages has been deposited upon the vehicle bed, the second pile of packages will, by the movement of the belt flight, have been brought forward approximately to the forward end of the skid 16. The belt flight operating motor 39 is therefore stopped when the first pile of packages is completely loaded and the skid 16 is further retracted by its motor 24 to its normal position. The loaded vehicle moves away and the second vehicle is backed up into position and the above described operation is repeated, loading the successive piles from the skid onto the vehicles.

In like manner, some of the piles may be small and others large, corresponding to the delivery routes of the vehicles.

In Fig. 5 is illustrated a diagram connection by which the above described operation may conveniently be performed. A double-throw switch 46 may be thrown toward the right to connect power supply mains 47 and 48 to the motor 24 to operate it in the forward direction, the current being controlled by the limit switch 45. Other limit switches 49 and 50 may be employed if desired, one to limit forward movement of the skid 16 independently of the vehicle and its operation of the limit switch 45, and another limit switch 50 may be used to limit rearward motion of the skid. Such limit switches in connection with traveling carriages, cranes, etc. are so well known that it is believed unnecessary to illustrate them in connection with the apparatus of the other figures.

Upon throwing the switch 46 in the other direction, current will be supplied to the motor 24 through the conductors 51 and 52, which, as will be clear reverses the direction of the motor 24 to retract the skid. At the same time the switch 46 may, by the blades thereof, engage contacts 53—53 which will supply current from the mains 47 and 48 to the motor 39. Thus, throwing the switch 46 to the right will move the skid forwardly and throwing it to the left will retract the skid and at the same time operate the belt flight to discharge the load upon the vehicle bed.

Where the device is used in multiple as above described, a switch 46 embodying the principles illustrated in Fig. 6 may be employed. Throwing the switch 46 to the right will drive the skid forwardly by the motor 24 to position the first load. Then throwing the switch 46 to the left will reverse the skid direction and energize the belt motor to discharge the load. When the load is discharged and it is desired then to stop the belt but continue the movement rearwardly of the skid, this may be accomplished by placing the switch blades in the position of Fig. 6 where, as shown, they contact with the reversing contacts for the motor 24 but are disconnected from the contacts 53—53 of the belt motor so that the skid may be retracted without movement of the belt. Positioning the switch blades as shown in dotted lines in Fig. 6 may be facilitated by the employment of a spring 54 of such length as to move the blade of the switch 46 out of engagement with the contacts 53 but leave it in engagement with the reversing switch contacts. For loading the next load, the operation may be repeated.

It will be understood that in either mode of operation above described, after the wheels 17 are on the truck bed 2 and while the load is being transferred from the belt to the bed, the main spring of the vehicle 1 which in the usual construction of trucks supports the bed 2, will be progressively compressed and the bed 2 will gradually move downwardly as more and more load is placed thereon. With the arrangement above described, it will be apparent that with the wheels 17 resting upon the bed 2, the entire skid pivots around the wheels 19 so that as the bed 2 descends, as above referred to, the wheels 17 will remain on the bed so that all of the load may be transferred to the bed with the minimum of disturbance thereof.

If desired, the screws 8—8 may be lowered to lower the rollers 6—6 as the bed 2 descends with load to insure the above mentioned pivoting action around the wheels 19—19 throughout a wide range of descending movement of the bed. The rollers 6—6 may again be elevated to suitably deposit the wheels 17—17 on the bed of the next succeeding truck if desired.

In the foregoing I have described my invention as applied to the process of loading a plurality of packages or articles from the skid 16 to the truck bed 2. My invention, however, is with equal advantage, applicable to the unloading of a pile or load of articles or packages from the bed 2 into the skid 16. When applied to this use, the motor 24 is energized in the direction to propel the skid forwardly and at the same time the motor 39 is energized to move the belt flight 33 rearwardly at the same speed as the forward movement of the skid. The wheels 17, as in the other mode of operation, engage the bed and carry the weight of the forward part of the skid clearing the skid from rollers 6. As the skid moves forward, it engages the forward roller 31 and the belt thereon with the rearmost articles and the upward rotation of the belt over the forward roller lifts the articles as the skid moves progressively forward, picking them up on the belt flight 33 and conveying them rearwardly into the skid as the skid moves forward. When the skid has reached its full forward position and all of the packages are on the belt flight 33, movement of the belt flight is stopped by stopping the motor 39 and the motor 24 is reversed to move the now loaded skid rearwardly to its normal position free from the truck bed 2.

If desired, in contemplation of unloading the truck by the above described means, a flexible sheet of material may be laid on the truck bed 2 before the articles are placed thereon and as the forward roller 31 advances, the rear edge of said flexible sheet may be manually or otherwise lifted so that the forward edge of the belt as it turns on the roller 31 may wedgingly move under the sheet, or between the sheet and the bed 2. As the forward movement of the skid 16 and the rearward movement of the belt flight 33 proceeds, as above described, the packages on the flexible sheet and the sheet itself are transferred to the belt flight in the skid, the forward edge of the belt ploughing, so to speak, under and progressively lifting the flexible sheet until the entire sheet and the load of articles thereon rests on the belt flight. The belt is then stopped and the skid reversed and retracted as above described.

It will be apparent that my invention is not limited to the exact details illustrated and described, these being in some respect diagrammatic, and therefore changes and modifications may be made therein within the spirit of my invention without sacrificing its advantages and within the scope of the appended claims.

I claim:

1. In a vehicle loading apparatus, a stationary main frame, a carriage, forward and rearward wheel supports for the carriage on which it may be propelled forwardly and rearwardly on the frame, the forward wheel support being adjustable to adjustably vary the height of the forward portion of the carriage, a supplemental wheel support on the forward portion of the carriage adapted to engage and roll upon the bed of the vehicle upon forward movement of the carriage, pulleys at the forward and rearward end of the carriage, a belt looped over the pulleys and having a substantially horizontal upper flight on which articles to be loaded may be placed, means for propelling the carriage forwardly without running movement of the belt, means for running the flight portion of the belt forwardly and the carriage rearwardly at substantially the same velocity.

2. In a loading apparatus for vehicles having a vertically movable bed, a stationary main frame, a carriage, forward and rearward wheel supports for the carriage on which it may be propelled forwardly and rearwardly on the frame, a supplemental wheel support on the forward portion of the carriage adapted to engage and roll upon the bed of the vehicle upon forward movement of the carriage to support the forward end portion of the carriage on the vehicle bed and to permit the carriage to pivot around the rearward wheel supports upon vertical movement of the vehicle bed without disengagement of the wheel support with the bed, a pulley at the forward end of the carriage, a belt looped over the pulley and having a substantially horizontal upper flight on which articles to be loaded may be placed, means for propelling the carriage forwardly without running movement of the belt, and means for running the flight portion of the belt forwardly and the carriage rearwardly at substantially the same velocity.

3. In a loading apparatus for vehicles having a vertically movable bed, a stationary main frame, a carriage, forward and rearward wheel supports for the carriage on which it may be propelled forwardly and rearwardly on the frame, electric motor means for propelling the carriage, a supplemental wheel support on a forward portion of the carriage adapted to engage and roll upon the bed of the vehicle upon forward movement of the carriage to support the forward end portion of the carriage on the vehicle bed and to permit the carriage to pivot around the rearward wheel supports upon vertical movement of the vehicle bed without disengagement of the wheel support with the bed, a pulley at a forward portion of the carriage, a belt looped over the pulley and having an upper flight on which articles to be loaded may be placed, switch means for controlling the motor means to propel the carriage forwardly without movement of the belt on the pulley, a second electric motor means for propelling the upper flight of the belt forwardly during rearward movement of the carriage and at substantially the same velocity as the carriage, and a limit switch controlling energization of the first named motor means adapted to engage with a portion of the vehicle to stop forward motion of the carriage at a predetermined extreme forward position thereof.

4. In a loading apparatus for vehicles having a vertically movable bed, a stationary main frame, a carriage, forward and rearward wheel supports for the carriage on which it may be propelled forwardly and rearwardly on the frame, a supplemental wheel support on the forward portion of the carriage adapted to engage and roll upon the bed of the vehicle upon forward movement of the carriage, to remove the carriage from the forward wheel support whereby the carriage may pivot vertically around the rearward wheel support upon vertical movement of the vehicle bed, means to discharge material to be loaded from the carriage upon the bed of the vehicle during rearward movement of the carriage.

5. In an apparatus of the class described a main frame, a carriage forwardly and rearwardly movable on the frame, a pulley on the forward portion of the carriage, a belt element looped over the pulley and having an upper substantially horizontal load supporting flight, the carriage being movable forwardly to dispose the belt loop over the vehicle bed and rearwardly to withdraw it, means to run the belt over the pulley to move the belt flight forwardly at substantially the same velocity as the rearward movement of the carriage and to move the belt flight rearwardly at substantially the same velocity as the forward movement of the carriage, and to cause the carriage to move forwardly and rearwardly without movement of the belt over the pulley.

6. A device of the character described, comprising a loader body adapted to carry a formed load and reciprocatively move into and out of a vehicle to be loaded; supporting means for said loader body including a supporting frame and rails and track wheels thereon; a motor for driving said track-wheels; support-rollers at the forward end of said supporting frame; running wheels on the forward end of said loader body; an under-body carrying said motor; an endless belt bottom in said loader body; a motor in said under-body for driving said belt bottom; a controller including means for putting said driving motor in forward movement to advance the loader body, means for putting said driving motor in reverse movement and said belt motor simultaneously in movement to forwardly move the belt bottom, and means for stopping said driving motor and said belt motor; a limit switch at the forward end of said loader body, a limit switch at the forward end of said supporting frame, and a limit switch at the back end of said supporting frame.

7. A device of the character described, comprising a loader body adapted to carry a formed load and reciprocatively move into and out of a vehicle to be loaded; supporting means for said loader body including a supporting frame and rails and track wheels thereon; a motor for driving said track-wheels; support-rollers at the forward end of said supporting frame; running wheels on the forward end of said loader body; an under-body carrying said motor; an endless belt bottom in said loader body; a motor in said under-body for driving said belt bottom; a controller including means for putting said driving motor in forward movement to advance the loader body, means for putting said driving motor in reverse movement and said belt motor simultaneously in movement to forwardly move the belt bottom, and means for stopping said driving motor and said belt motor; a limit switch at the forward end of said loader body; and a limit switch at the forward end of said supporting frame.

8. A device of the character described, comprising a loader body adapted to carry a formed load and reciprocatively move into and out of a vehicle to be loaded; supporting means for said loader body including a supporting frame and rails and track-wheels thereon; a motor for driving said track-wheels; support-rollers at the forward end of said supporting frame; running wheels on the forward end of said loader body; an under-body carrying said motor; an endless belt bottom in said loader body; a motor in said under-body for driving said belt bottom; a controller including means for putting said driving motor in forward movement to advance the loader body, means for putting said driving motor in reverse movement and said belt motor simultaneously in movement to forwardly move the belt bottom, and means for stopping said driving motor and said belt motor; and a limit switch at the forward end of said loader body.

9. A device of the character described, comprising a loader body adapted to carry a formed load and reciprocatively move into and out of a vehicle to be loaded; supporting means for said loader body including a supporting frame and rails and track-wheels thereon; a motor for driving said track-wheels; support-rollers at the forward end of said supporting frame; running wheels on the forward end of said loader body; an under-body carrying said motor; an endless belt bottom in said loader body; a motor in said under-body for driving said belt bottom; and a controller including means for putting said driving motor in forward movement to advance the loader body, means for putting said driving motor in reverse movement and said belt motor simultaneously in movement to forwardly move the belt bottom, and means for stopping said driving motor and said belt motor.

10. In a loading apparatus for loading a succession of vehicles having beds of different elevations from the ground, a stationary main frame, a carriage, a forward and rearward wheel support for the carriage on which it may be propelled forwardly and rearwardly on the frame, a supplemental support on a forward portion of the carriage adapted to engage and move longitudinally upon the bed of the vehicle upon forward movement of the carriage to support the forward end of the carriage on the vehicle bed independently of the support of the forward portion of the carriage on the frame, a belt looped over a forward portion of the carriage and having a substantially horizontal upper flight upon which articles to be loaded may be placed, means for propelling the carriage forwardly without running movement of the belt flight and means for then running the belt flight forwardly and the carriage rearwardly at substantially the same velocity.

11. In a loading apparatus for loading a succession of vehicles having beds of different elevations from the ground, a stationary main frame, a carriage, forward and rearward wheel supports for the carriage on which it may be propelled forwardly and rearwardly on the frame, the forward wheel supports being adjustable to adjustably vary the height of the forward portion of the carriage, a supplemental support on the forward portion of the carriage adapted to engage and move longitudinally upon the bed of the vehicle upon forward movement of the carriage, a belt looped over a forward portion of the carriage and having a substantially horizontal upper flight on which articles to be loaded may be placed, means for propelling the carriage forwardly without running movement of the belt flight, means for running the belt flight forwardly and the carriage rearwardly at substantially the same velocity.

12. In a loading apparatus for vehicles having a vertically shiftable bed, a stationary main frame, a carriage, forward and rearward wheel supports for the carriage on which it may be propelled forwardly and rearwardly on the frame, a supplemental support on the forward portion of the carriage adapted to engage and move longitudinally upon the bed of the vehicle upon forward movement of the carriage to support the forward portion of the carriage on the vehicle bed and permit the carriage to pivot around the rearward wheel supports upon vertical shifting of the bed without disengagement of the supplemental support with the bed, a carriage bed having an upper portion upon which articles to be loaded may be placed, the upper bed portion being movable forwardly, means for propelling the carriage forwardly without forward movement of the carriage bed, and means for moving the carriage bed forwardly and the carriage rearwardly at substantially the same velocity.

13. In a loading apparatus for vehicles having a vertically shiftable bed, a stationary main frame, a carriage, forward and rearward wheel supports for the carriage on which it may be propelled forwardly and rearwardly on the frame, a supplemental support on the forward portion of the carriage adapted to engage and move longitudinally upon the bed of the vehicle upon forward movement of the carriage to support the forward portion of the carriage on the vehicle bed and permit the carriage to pivot around the rearward wheel supports upon vertical shifting of the bed without disengagement of the supplemental support with the bed, a carriage bed having an upper portion upon which articles to be loaded may be placed, the upper bed portion being movable forwardly, means for propelling the carriage forwardly without forward movement of the carriage bed, and means for moving the carriage bed forwardly and the carriage rearwardly at substantially the same velocity and the forward wheel support for the carriage being adjustable to adjustably vary the height of the forward portion of the carriage while on the main frame.

14. A device of the character described, comprising a loader body adapted to carry a formed load and reciprocatively move into and out of a vehicle to be loaded; supporting means for said loader body including a supporting frame and rails and track wheels thereon, a motor for driving said track-wheels, support-rollers at the forward end of said supporting frame, running wheels on the forward end of said loader body, an under-body carrying said motor, an endless belt bottom in said loader body, a motor in said under-body for driving said belt bottom, a controller including means for putting said driving motor in forward movement to advance the loader body, means for putting said driving motor in reverse movement and said belt motor simultaneously in movement to forwardly move the belt bottom, and means for stopping said driving motor and said belt motor.

15. A device of the character described, comprising a loader body adapted to carry a formed load and reciprocatively move into and out of a vehicle to be loaded, supporting means for said loader body including a supporting frame and rails and track wheels thereon, a motor for driving said track-wheels, support-rollers at the forward end of said supporting frame, running wheels on the forward end of said loader body, an under-body carrying said motor, an endless belt bottom in said loader body, a motor in said under-body for driving said belt bottom, a controller including means for putting said driving motor in forward movement to advance the loader body, means for putting said driving motor in reverse movement and said belt motor simultaneously in movement to forwardly move the belt bottom, and means for stopping said driving motor and said belt motor.

16. A device of the character described, comprising a loader body adapted to carry a formed load and reciprocatively move into and out of a vehicle to be loaded, supporting means for said loader body including a supporting frame and rails and track-wheels thereon, a motor for driving said track-wheels, support-rollers at the forward end of said supporting frame, running wheels on the forward end of said loader body, an underbody carrying said motor, an endless belt bottom in said loader body, a motor in said under-body for driving said belt bottom, a controller including means for putting said driving motor in forward movement to advance the loader body, means for putting said driving motor in reverse movement and said belt motor simultaneously in movement to forwardly move the belt bottom, and means for stopping said driving motor and said belt motor.

17. In a load transfer apparatus of the type comprising a main frame and a forwardly and rearwardly movable body adapted to carry a load, a wheel support on the frame for movably supporting the body, the wheel support comprising a frame element extending transversely of the main frame, a pair of wheels rotatably supported on the frame element disposed under laterally spaced portions of the body, means on the frame to adjustably raise and lower the transverse frame element to adjustably raise and lower the wheels.

18. In a vehicle loading apparatus, a main frame, a carriage, spaced wheel supports upon which the carriage may be reversely propelled on the frame, a supplemental wheel support on the forward portion of the carriage adapted to engage and move upon the bed of the vehicle upon forward movement of the carriage, conveyor means extending longitudinally of the carriage on which articles to be loaded may be placed, means for propelling the carriage forwardly with the conveyor inoperative, means for running the conveyor forwardly and the carriage rearwardly at substantially the same velocity.

19. In a vehicle loading apparatus, a main frame, a carriage, space wheel supports upon which the carriage may be reversely propelled on the frame, one of said wheel supports being adjustable to adjustably vary the height of a portion of the carriage, a supplemental wheel support on the forward portion of the carriage adapted to engage and move upon the bed of the vehicle upon forward movement of the carriage, conveyor means extending longitudinally of the carriage, conveyor means extending longitudinally of the carriage on which articles to be loaded may be placed, means for propelling the carriage forwardly with the conveyor inoperative, means for running the conveyor forwardly and the carriage rearwardly at substantially the same velocity.

20. In a loading apparatus for vehicles having a vertically movable bed, a stationary main frame, a carriage, a forward and rearward wheel support for the carriage on which it may be propelled forwardly and rearwardly on the frame, a supplement wheel support on the forward portion of the carriage adapted to engage and move upon the bed of the vehicle upon forward movement of the carriage, to remove the carriage from the forward wheel support whereby the carriage may pivot vertically around the rearward wheel support upon vertical movement of the vehicle bed, means to discharge material to be loaded from the carriage upon the bed of the vehicle during rearward movement of the carriage.

JAMES F. MAINE.